(12) United States Patent
Mitchell et al.

(10) Patent No.: US 11,439,916 B2
(45) Date of Patent: Sep. 13, 2022

(54) FOOD ORDERING VIA EMBEDDED LINKS IN VIDEO GAME ADVERTISING

(71) Applicant: Paradigm Shift Technologies LLC, Ballwin, MO (US)

(72) Inventors: Bryce Mitchell, Ballwin, MO (US); Marvin Carpenter, Madison, AL (US)

(73) Assignee: Paradigm Shift Technologies LLC, Garland, TX (US)

( * ) Notice: Subject to any disclaimer, the term of this patent is extended or adjusted under 35 U.S.C. 154(b) by 136 days.

(21) Appl. No.: 16/949,367

(22) Filed: Oct. 27, 2020

(65) Prior Publication Data

US 2021/0038999 A1    Feb. 11, 2021

Related U.S. Application Data

(63) Continuation-in-part of application No. 15/876,919, filed on Jan. 22, 2018, now Pat. No. 10,850,200.

(60) Provisional application No. 62/448,640, filed on Jan. 20, 2017.

(51) Int. Cl.
*A63F 13/35* (2014.01)
*A63F 13/85* (2014.01)
*A63F 13/792* (2014.01)

(52) U.S. Cl.
CPC .............. *A63F 13/85* (2014.09); *A63F 13/35* (2014.09); *A63F 13/792* (2014.09)

(58) Field of Classification Search
CPC .......................... G07F 17/32; G07F 17/3255
See application file for complete search history.

(56) References Cited

U.S. PATENT DOCUMENTS

2011/0078019 A1* 3/2011 Klappert ............ G06Q 30/0253
                                                                 709/224
2016/0110957 A1* 4/2016 Vaysman ........... G06Q 30/0275
                                                                  463/16

OTHER PUBLICATIONS

EverQuest II Video Game (evidenced by c-net article dated Feb. 18, 2005) published 2005 (Year: 2005).*

* cited by examiner

*Primary Examiner* — James S. McClellan
(74) *Attorney, Agent, or Firm* — Squire Patent Consulting & IP Law LLC; Brendan E. Squire

(57) ABSTRACT

A food order and delivery system by embedded internet links in existing video games advertisements and delivered to the gamer. The invention connects restaurants not offering an internet ordering, payment, with a delivering system for customers currently involved in gaming, allowing them to continue gaming while enjoying delivery of their cuisine of choice.

20 Claims, 4 Drawing Sheets

FIG. 5

FOOD ORDERING VIA EMBEDDED LINKS IN VIDEO GAME ADVERTISING

CROSS-REFERENCE TO RELATED APPLICATION

This application is a continuation in part of U.S. patent application Ser. No. 15/876,919, filed Jan. 22, 2018 and claims the benefit of priority of U.S. provisional application No. 62/448,640, filed Jan. 20, 2017, the contents of which are herein incorporated by reference.

BACKGROUND OF THE INVENTION

The present invention relates to video gaming, and more particularly to embedded links for advertising within video gaming titles.

The present invention allows for longer gameplay by minimizing the necessary time for a gamer to acquire sustenance. It also allows gamer access to an increased variety of food beyond the traditionally delivered food items, such as pizza, Asian cuisine, and occasionally sandwiches.

Most video games are already connected to the internet for multi-player game play. However, current games lack the code linking an internet portal to restaurants that do not offer a delivery service. Few restaurants allow ordering and paying for food via a separate internet portal for delivery external to video games because few restaurants are interested in investing in a delivery infrastructure.

As can be seen, there is a need for a system, method, and apparatus, that connects restaurants offering cuisine that is not normally considered take-out or delivery fare, with an internet ordering, payment, and delivery system to reach new customers currently involved in gaming, allowing them to continue gaming with their cuisine of choice.

SUMMARY OF THE INVENTION

One aspect of the present invention includes a method for ordering products through an on-line video game. The method for ordering products through an on-line video game includes process steps. The process steps include presenting the on-line video game to one or more gamers, the on-line video game having a virtual game environment in which the gamers participate in the on-line video game. One or more representations of a product is presented within the virtual game environment, the one or more representations of the product having a link containing an embedded code corresponding to one or more vendors of the product within a geographic proximity to a physical location of the gamer. Responsive to a gamer selection of the advertisement within the virtual game environment, automatically presenting an order menu corresponding to the one or more vendors associated with the embedded code, the ordering menu having a plurality of controls configured to enable the gamer to order one or more items from the order menu. Responsive to an order placed by the gamer within the virtual game environment, delivering the one or more ordered items to the physical location of the gamer.

In some embodiments, the ordering menu is generated from a locally installed application resident on a game console of the gamer. In other embodiments, the ordering menu is generated by a third party hosted web service providing access to menu items of a plurality of restaurants. In yet other embodiments, the ordering menu is generated by a vendor hosted ordering service.

In some instances, the delivery service places the order for the one or more ordered items with the vendor.

In some embodiments, the method includes exchanging a gaming environment currency for a payment species utilized in a geographic location of the vendor and paying the vendor in the determined payment species.

In other aspects of the invention, a computerized system for ordering a product from within a virtual game environment of an on-line video game, is disclosed. The system includes: a computer having a user interface; and a program product comprising machine-readable program code for causing, when executed, the computer to perform process steps. The process steps may include presenting the on-line video game to one or more gamers, the on-line video game having a virtual game environment in which the one or more gamers participate in the on-line video game. One or more representations of the product are then presented within the virtual game environment, the one or more representations of the product having an embedded code corresponding to one or more vendors of the product within a predetermined geographic proximity to the gamer. Responsive to a gamer selection of the representation of the product within the virtual game environment, automatically presenting an order menu corresponding to the one or more vendors associated with the embedded code, the ordering menu having a plurality of controls that are configured to enable the gamer to order one or more items from the order menu. Responsive to an order placed by the gamer within the virtual game environment, delivering the one or more ordered items to a physical address specified by the gamer.

In some embodiments, the ordering menu is generated from a locally installed application resident on a game console of the gamer. In other embodiments, the ordering menu is generated by a third party hosted web service providing access to menu items of a plurality of restaurants. In yet other embodiments, the ordering menu is generated by a vendor hosted ordering service. The delivery service may place the order for the one or more ordered items with the vendor.

In yet other embodiments, the method steps include exchanging a gaming environment currency for a payment species utilized in a geographic location of the vendor and paying the vendor in the determined payment species.

In some instances, a delivery service affiliated with a host service provider for the on-line video game provide delivery of the one or more ordered items between the vendor and the gamer. In other instances, the delivery service may place the order for the one or more ordered items with the vendor. A favorite order for the gamer may also be saved in the virtual game environment.

In yet other aspects of the invention a computer program product comprising machine-readable program code stored in a non-transient storage medium for causing, when executed, a computer to perform process steps. The steps include presenting an on-line video game to one or more gamers, the on-line video game having a virtual game environment in which the gamers participate in the on-line video game. One or more representations of the product are presented within the virtual game environment, the one or more representations of the product having an embedded code corresponding to one or more vendors of the product within a predetermined geographic proximity to a physical location of the one or more gamers. Responsive to a gamer selection of the representation of the product within the virtual game environment, automatically presenting an order menu corresponding to the one or more vendors associated with the embedded code, the ordering menu having a plurality of controls configured to enable the gamer to order one or more items from the order menu. Responsive to an order placed by the gamer within the virtual game environment, providing instructions to a delivery service to deliver the one or more ordered items to a physical address specified by the gamer.

In some instances, the ordering menu is generated from a locally installed application resident on a game console of the gamer. In other instances, the ordering menu is generated by a third party hosted web service providing access to menu items of a plurality of restaurants. In yet other instances, the ordering menu is generated by a vendor hosted ordering service.

In some embodiments the process steps include exchanging a gaming environment currency for a payment species utilized in a geographic location of the vendor and paying the vendor in the payment species in the geographic location of the vendor.

These and other features, aspects and advantages of the present invention will become better understood with reference to the following drawings, description and claims.

BRIEF DESCRIPTION OF THE DRAWINGS

FIG. 5 is a representation of a current listing of menu items on a participating restaurants' menu.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provide a system, method, and apparatus that allows for longer game play times by minimizing the time necessary for the gamer to commit to order and acquire sustenance. The system and method allows for an increased variety of food choices beyond the traditionally delivered fare, such as pizza, Asian cuisine, and an occasional sandwich.

The present invention closes the gap between gamers and a variety of prepared cuisines. It also widens the variety of restaurants that may participate with an internet food ordering system, by providing an affiliated delivery service, that doesn't require the restaurant to invest in a delivery infrastructure. Restaurants canl pay to a subscription business model for their delivery needs associated with food orders received through the service.

My research indicates this has only been done within a closed environment, such as a casino. However, when fully implemented, the system of the present invention may encompass an entire city/or a plurality of cities consisting of gamers playing a multi-player game title.

As indicated, currently games lack a code linking an internet portal to restaurants that do not offer a delivery service. Few restaurants allow ordering and paying for food via a separate internet portal, such as for delivery external to video gamers, because few of these restaurants are interested in investing in a delivery infrastructure. My invention connects restaurants not offering an internet ordering, payment, and delivering system to customers currently involved in gaming, allowing them to continue gaming while being able to enjoy their cuisine of choice.

Figure 1:
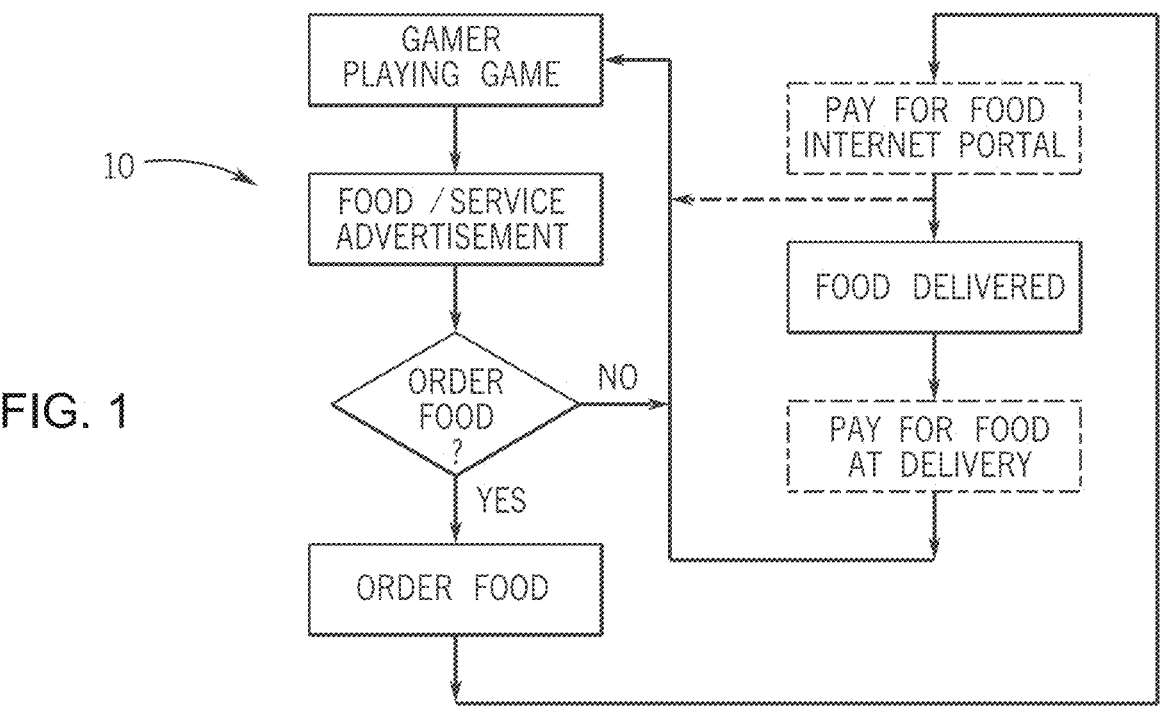
FIG. 1 is a flow chart illustrating a representative embodiment of the present invention.
Figure 3:
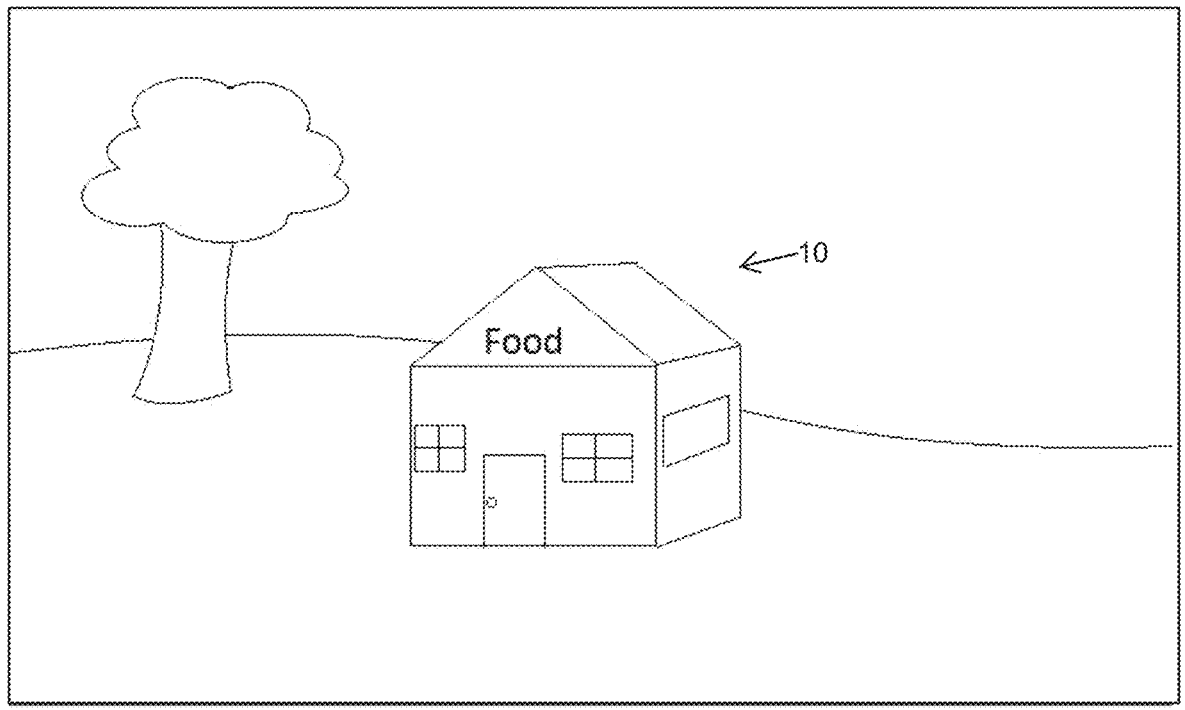
FIG. 3 is a virtual representation of a restaurant within the game environment.

As seen in reference to FIG. 1, a representative process flow of the present invention is shown. Initially a gamer may be playing one of a plurality of single or multi-player game titles. The video game title maker may insert a code into an existing advertisement that may appear in a game environment. The code may link the gamer to an internet portal with a current listing of participating restaurants and menus, from which to order food items. Alternatively, as seen in reference to FIG. 3, the link may correspond to a virtual representation of the restaurant within the gaming environment.

Figure 4:
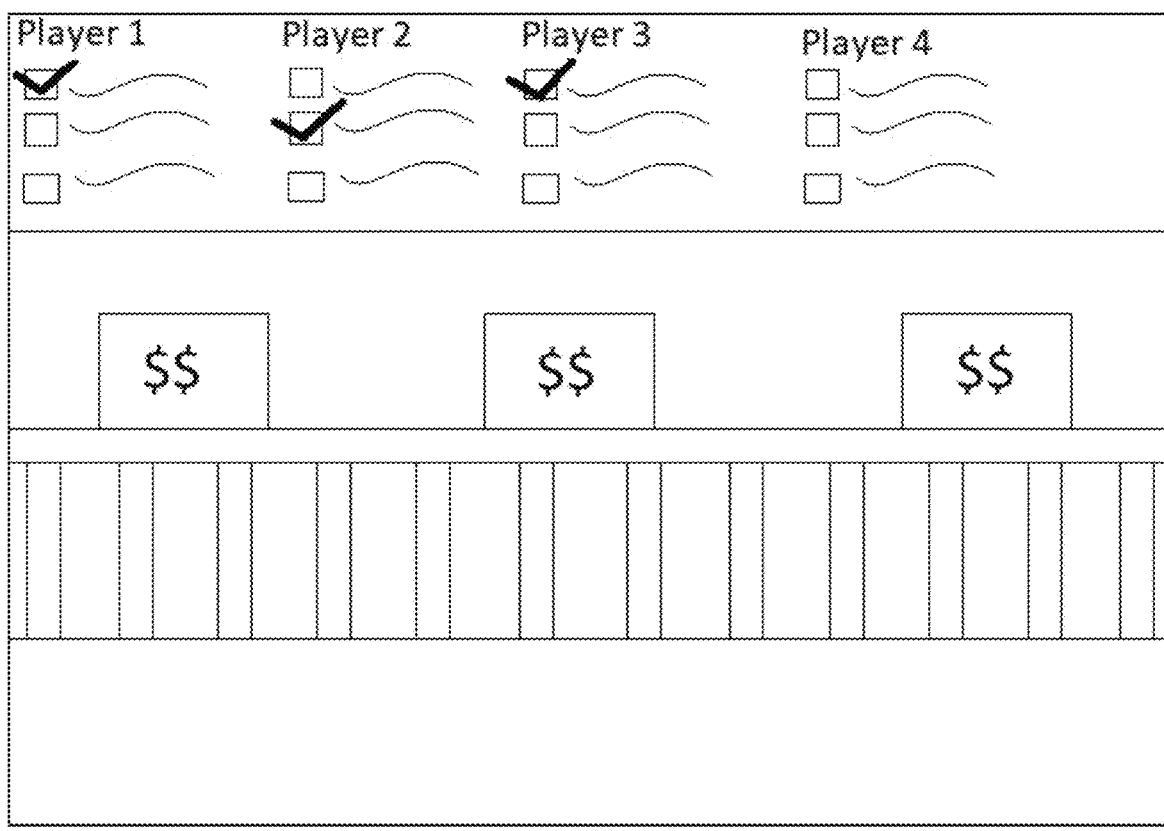
FIG. 4 is an alternative virtual representation of the restaurant within the game environment.
Figure 5:
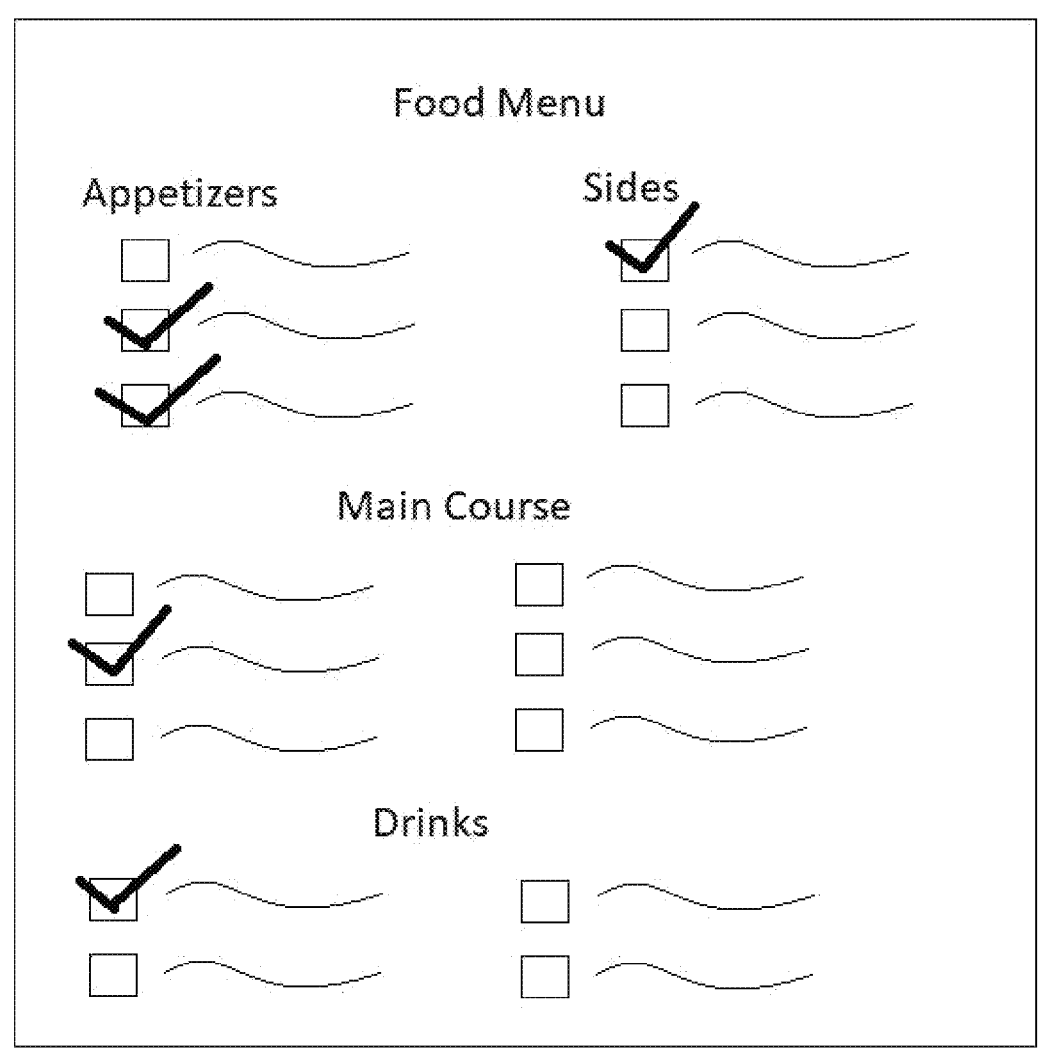

The gamer may select the advertisement 10 from within the game title. If the gamer decides not to order food, the program directs the gamer back to playing the game. As seen in reference to FIGS. 4 and 5, if the gamer decides to order food through the food service advertisement 10, a program display leads to an internet ordering portal with a current listing of menu items on the participating restaurants' menu.

The code linking the gamer to the internet portal may also allow the gamer to save an order or orders to more quickly reorder a preferred menu item at a later date.

The Internet portal may be configured to either accept payment on line or cash on delivery. The internet portal is also configured to transmit the order to one or more participating delivery services. The participating delivery service picks up the food from a non-delivering restaurant, and the participating delivery service delivers the food to the gamer. The internet portal may be configured to use the gamer's location for delivery, which would allow the gamer to order food from a variety of locations.

Figure 2:
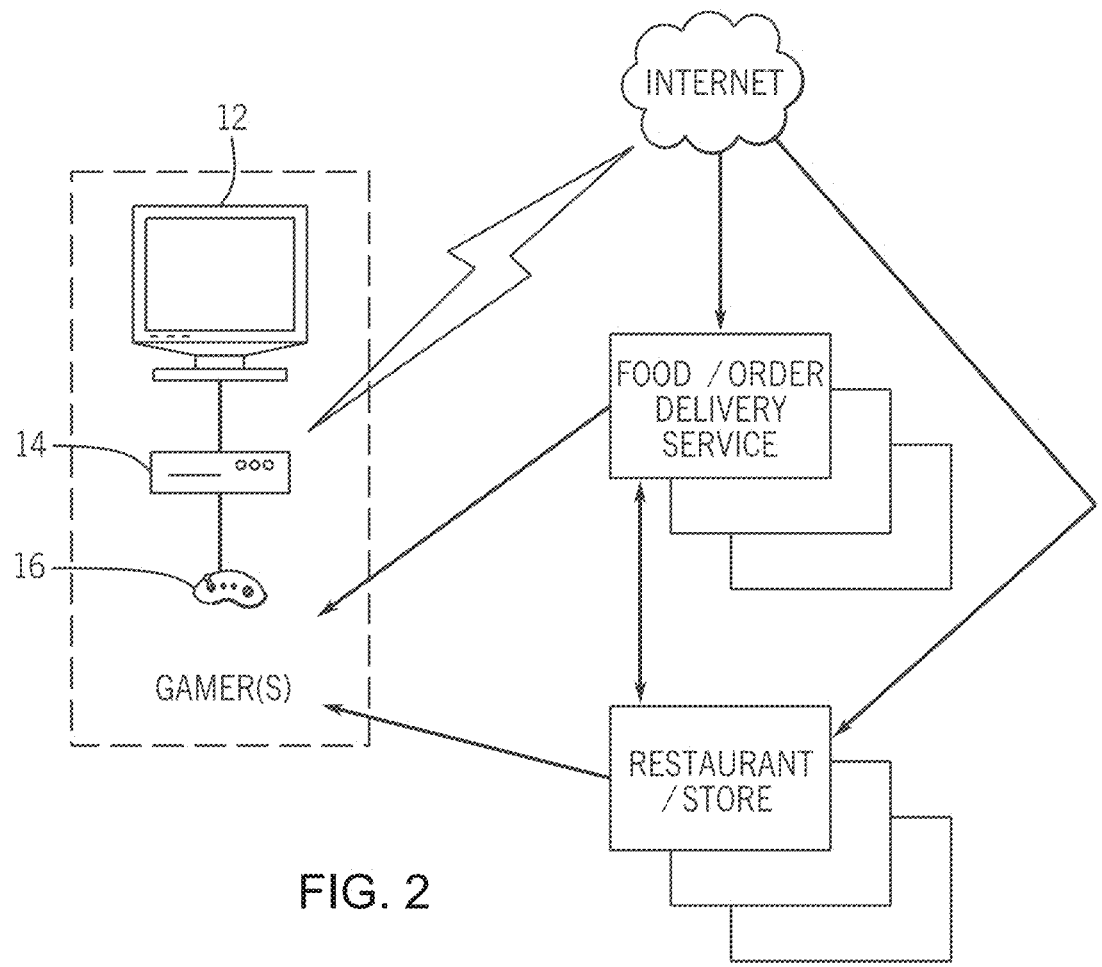
FIG. 2 is a representative system architecture for an embodiment of the present invention.

As seen in reference to FIG. 2, a gamer is connected to the internet via a display screen 12 and a game console 14. The gamer interacts with the system via a game controller 16. A plurality of restaurants or stores may also be connected to the internet and may be selected based on the geographic proximity of the plurality of gamers participating in a game. The plurality of restaurants or stores typically will not have their own delivery capability, which may be performed by a third party delivery service at 30.

The Internet portal accepts payment and issues a delivery order to the delivery service. The delivery service buys food at restaurant and delivers food and/or accepts cash payment.

A gamer would select a restaurant advertisement in a game unique from other advertisements while playing the game, linking to an internet-based menu to select and/or pay for food. The gamer would then return to gaming until the food is delivered and may continue gaming while eating. Optionally, as seen in reference to FIG. 4, the gamer may also be presented an option to place orders for one or more other disparately located other game players, such as teammates that he may be linked to via the online game site. For example, the gamer could place an order as a reward for a teammate who has had an exceptional performance during game play. Likewise, the gamer could also place an order for an adversary who has played well as an opponent as a token of appreciation for a game well played. The system would present restaurants or stores in proximity to these disparately located players.

Figure 6:
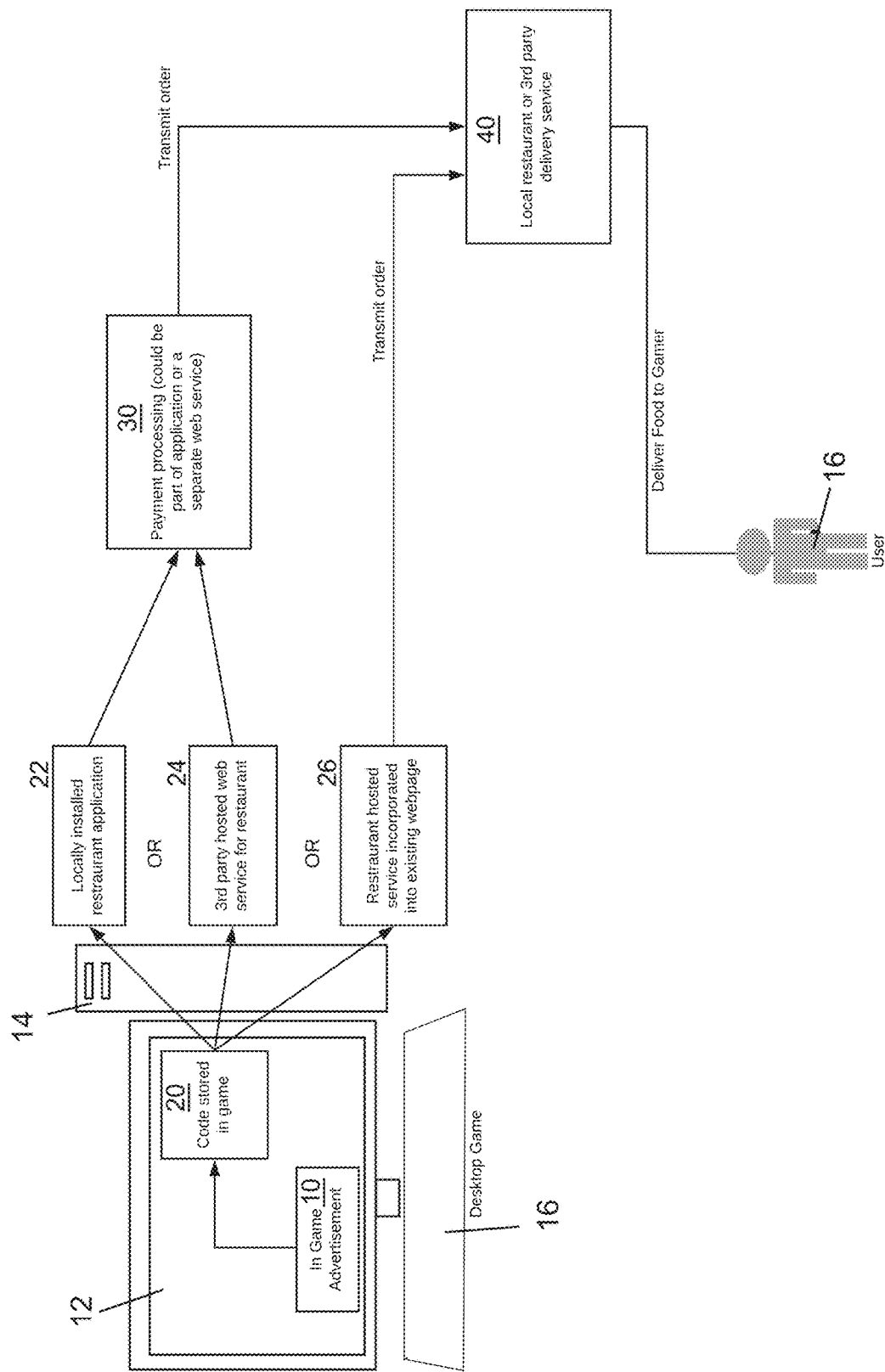
FIG. 6 is a diagram illustrating an ordering system for ordering an item within a virtual game environment for delivery to a physical location of a gamer.

As seen in reference to FIG. 6, the gamer 16 may interact with the game presented in the display screen 12 connected to game console 14. The gamer 12 may select an advertisement 10 within the game environment. A code 20 is stored within the game environment to select from one or more ordering portals 22, 24, 26 through which the vendor corresponding to the advertisement is able to receive and process orders. In a first case, the ordering portal 22 may be a locally installed application specific to the selected vendor. The gamer 16 places the order through the application, which may have a payment portal 30 included therein. If no payment portal is present in the embedded ordering portal 22, the system may link to a web payment service, such as PayPal. When payment is made, the order is transmitted to the local vendor 40 which may be a restaurant, or a local franchise thereof. The vendor 40 may have an internal delivery service or may utilize the services of a third party delivery service to deliver the food or order to the gamer 16.

In a second instance, the code 20 may launch a third party hosted web service 24 for the vendor, the order may be placed within a window while the game environment continues in the display screen 12. Alternatively, the display screen 12 may present the third party hosted web service 24 in a full screen mode. Payment processing 30 may be accomplished through the third party hosted web service 24 or via a third party payment processing service. When payment is made, the order is transmitted to the local vendor 40 which may be a restaurant, or a local franchise thereof. The vendor 40 may have an internal delivery service or may utilize the services of a third party delivery service to deliver the food or order to the gamer 16.

In a third instance, the code 20 may launch a restaurant hosted service 26 incorporated into an existing vendor web page. With the restaurant hosted service 26, the order may be placed within a window while the game environment continues in the display screen 12. Alternatively, the display screen 12 may present the third restaurant hosted web service 26 in a full screen mode. Payment processing 30 may be accomplished through the third vendor hosted web service 24 or via a third party payment processing service. When payment is made, the order is transmitted to the local vendor 40 which may be a restaurant, or a local franchise thereof. The vendor 40 may have an internal delivery service or may utilize the services of a third party delivery service to deliver the food or order to the gamer 16.

In each of the forgoing instances, the payment processing may include utilizing a game environment currency for processing the transaction. In this embodiment, the gamer 16 may protect dissemination of their financial account information with the selected vendor. Instead, the gamer 16 may rely on a balance of their game currency, which they have purchased from the game host. In the transaction, the game host would exchange the game currency to a payment species utilized in the geographic area of the gamer based on a then current exchange rate. The game host may then serve as a third party payment system for the gamer's order.

While described in the context of a ordering food from a restaurant, the present invention could also be used for a gamer to remotely shop at convenience stores via the internet portal, increasing order variety. The present invention may also be employed as a business model consisting of one or all of these elements and other elements contracted.

The system of the present invention may include at least one computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The computer-based data processing system and method described above is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail.

It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A method for ordering products through an on-line video game, comprising:
    presenting the on-line video game to one or more gamers, the on-line video game having a virtual game environment in which the gamers participate in the on-line video game;
    presenting one or more representations of a product within the virtual game environment, the one or more representations of the product having a link containing an embedded code corresponding to one or more vendors of the product within a geographic proximity to a physical location of the gamer;
    responsive to a gamer selection of the advertisement within the virtual game environment, automatically presenting an order menu corresponding to the one or more vendors associated with the embedded code, the ordering menu having a plurality of controls configured to enable the gamer to order one or more items from the order menu; and responsive to an order placed by the gamer within the virtual game environment, delivering the one or more ordered items to the physical location of the gamer.

2. The method of claim 1, wherein the ordering menu is generated from a locally installed application resident on a game console of the gamer.

3. The method of claim 1, wherein the ordering menu is generated by a third party hosted web service providing access to menu items of a plurality of restaurants.

4. The method of claim 1, wherein the ordering menu is generated by a vendor hosted ordering service.

5. The method of claim 3, wherein the delivery service places the order for the one or more ordered items with the vendor.

6. The method of claim 1, further comprising:
exchanging a gaming environment currency for a payment species utilized in a geographic location of the vendor; and
paying the vendor in the determined payment species.

7. A computerized system for ordering a product from within a virtual game environment of an on-line video game, the system comprising:
a computer having a user interface; and
a program product comprising machine-readable program code for causing, when executed, the computer to perform the following process steps:
presenting the on-line video game to one or more gamers, the on-line video game having a virtual game environment in which the one or more gamers participate in the on-line video game;
presenting one or more representations of the product within the virtual game environment, the one or more representations of the product having an embedded code corresponding to one or more vendors of the product within a predetermined geographic proximity to the gamer;
responsive to a gamer selection of the representation of the product within the virtual game environment, automatically presenting an order menu corresponding to the one or more vendors associated with the embedded code, the ordering menu having a plurality of controls configured to enable the gamer to order one or more items from the order menu; and
responsive to an order placed by the gamer within the virtual game environment, delivering the one or more ordered items to a physical address specified by the gamer.

8. The system of claim 7, wherein the ordering menu is generated from a locally installed application resident on a game console of the gamer.

9. The system of claim 7, wherein the ordering menu is generated by a third party hosted web service providing access to menu items of a plurality of restaurants.

10. The system of claim 7, wherein the ordering menu is generated by a vendor hosted ordering service.

11. The system of claim 9, wherein the delivery service places the order for the one or more ordered items with the vendor.

12. The system of claim 7, further comprising:
exchanging a gaming environment currency for a payment species utilized in a geographic location of the vendor; and
paying the vendor in the determined payment species.

13. The system of claim 7 further comprising:
a delivery service affiliated with a host service provider for the on-line video game, the delivery service providing delivery of the one or more ordered items between the vendor and the gamer.

14. The system of claim 13, wherein the delivery service places the order for the one or more ordered items with the vendor.

15. The system of claim 14, further comprising:
saving a favorite order for the gamer in the virtual game environment.

16. A computer program product comprising machine-readable program code stored in a non-transient storage medium for causing, when executed, a computer to perform the following process steps:
presenting an on-line video game to one or more gamers, the on-line video game having a virtual game environment in which the gamers participate in the on-line video game;
presenting one or more representations of the product within the virtual game environment, the one or more representations of the product having an embedded code corresponding to one or more vendors of the product within a predetermined geographic proximity to a physical location of the one or more gamers;
responsive to a gamer selection of the representation of the product within the virtual game environment, automatically presenting an order menu corresponding to the one or more vendors associated with the embedded code, the ordering menu having a plurality of controls configured to enable the gamer to order one or more items from the order menu; and
responsive to an order placed by the gamer within the virtual game environment, providing instructions to a delivery service to deliver the one or more ordered items to a physical address specified by the gamer.

17. The computer program product of claim 16, wherein the ordering menu is generated from a locally installed application resident on a game console of the gamer.

18. The method of claim 16, wherein the ordering menu is generated by a third party hosted web service providing access to menu items of a plurality of restaurants.

19. The method of claim 16, wherein the ordering menu is generated by a vendor hosted ordering service.

20. The method of claim 1, further comprising:
exchanging a gaming environment currency for a payment species utilized in a geographic location of the vendor; and
paying the vendor in the payment species in the geographic location of the vendor.

* * * * *